United States Patent [19]
Hansson

[11] Patent Number: 5,960,583
[45] Date of Patent: Oct. 5, 1999

[54] TRAP FOR CATCHING AND KILLING OF SMALL ANIMALS

[76] Inventor: Göran Hansson, Värjovägen 17, S-360 24, Linneryd, Sweden

[21] Appl. No.: 08/973,546
[22] PCT Filed: Jun. 12, 1996
[86] PCT No.: PCT/SE96/00771
   § 371 Date: Dec. 19, 1997
   § 102(e) Date: Dec. 19, 1997
[87] PCT Pub. No.: WO97/00607
   PCT Pub. Date: Jan. 9, 1997

[30] Foreign Application Priority Data

Jun. 21, 1995 [SE] Sweden ................................. 9502253

[51] Int. Cl.$^6$ ............................ A01M 23/26; A01M 23/30
[52] U.S. Cl. ............................................... 43/81; 43/82
[58] Field of Search ............................ 43/81, 81.5, 82, 43/83, 92

[56] References Cited

U.S. PATENT DOCUMENTS

| | | | |
|---|---|---|---|
| 830,693 | 9/1906 | Westgaard | 43/82 |
| 1,665,020 | 4/1928 | Catlin | 43/82 |
| 2,577,354 | 12/1951 | Oakes | 43/82 |
| 2,581,327 | 1/1952 | Knox, III | 43/82 |
| 3,992,803 | 11/1976 | Kaiser | 43/83 |
| 4,991,340 | 2/1991 | Schildt | 43/81 |

FOREIGN PATENT DOCUMENTS

| | | |
|---|---|---|
| 37719101760 | 8/1923 | Norway . |
| 101760 | 10/1916 | United Kingdom . |
| 2252485 | 1/1992 | United Kingdom . |

*Primary Examiner*—Michael J. Carone
*Assistant Examiner*—Elizabeth Shaw
*Attorney, Agent, or Firm*—Robert Platt Bell & Associates, P.C.

[57] ABSTRACT

A trap for trapping and killing small animals such as rats and mice, is described. The trap comprises a stand, a pivoting clamp, journalled in the stand around a first axis. The clamp may be strained against the action of a spring which may be released by a releasing mechanism from a first, loaded position, when an animal acts upon the releasing mechanism. When released, the clamp immediately swings, acted upon by the spring, to a second position, where it hits and kills the animal. The clamp, extending from the first axis is provided with a first arm and a second arm. A first fastening point of the spring is provided at an end that is turned from the first axis of the first arm. The second fastening point of the spring is provided at the stand. The force line between the two fastening points of the spring runs through or in the vicinity of the first axis such that the spring exerts little or no or torque in the direction towards the second position of the clamp. The trap is primarily characterized in that the releasing mechanism is journalled around the second axis in the stand, forming a first arm portion designed like a cap above a vessel for bait. A second arm portion acts upon the first arm of the clamp when the cap is lifted by the animal.

10 Claims, 11 Drawing Sheets

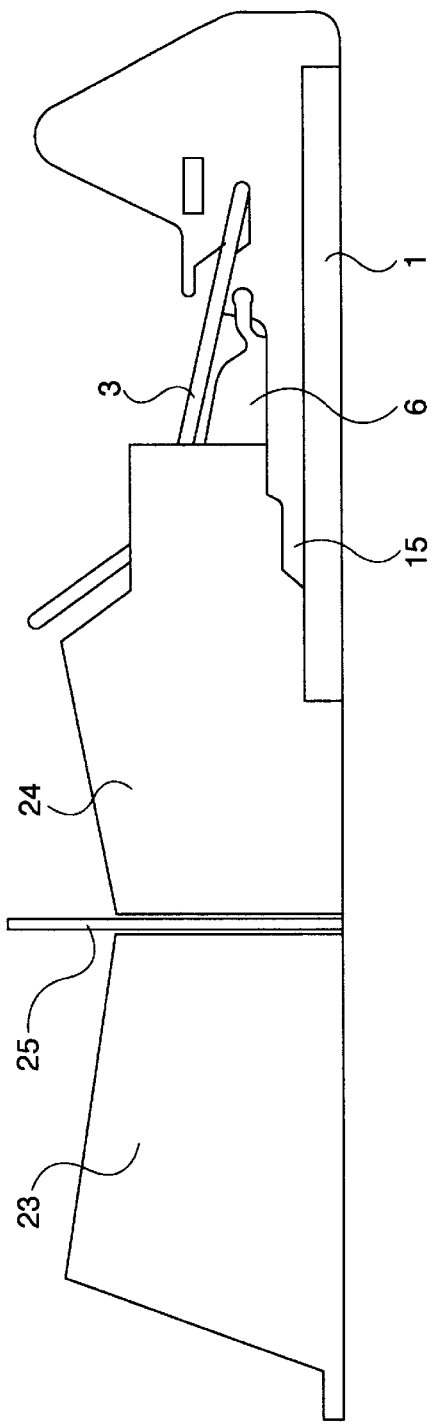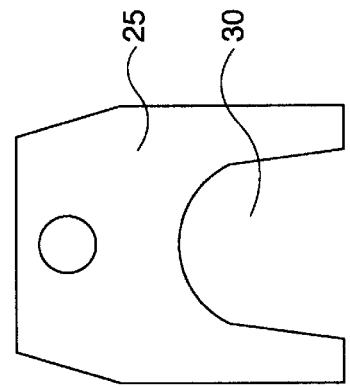
Figure 4A
Figure 4B

TRAP FOR CATCHING AND KILLING OF SMALL ANIMALS

FIELD OF THE INVENTION

The present invention relates to a trap for trapping and killing of small animals such as rats, mice, and the like.

BACKGROUND OF THE INVENTION

Mouse, rat, and other types of small animal traps are well known in the art. Such traps may, for instance, comprise a stand in the form of a plate, at which a clamp may be stretched against the force of a spiral spring, arranged around its turning axis to a loaded position, in which a lock pin keeps the clamp means at the plate. The free end of the lock pin is inserted in the loop of a locking means in the form of a movable plate, at which the bait is fixed (e.g., in the form of a piece of cheese).

Traps of this type have some limitations and drawbacks. It is relatively troublesome and hazardous to load such traps, and positively two hands are required. Often, the trap hits the fingers of the user while the user tries to set or move the trap. Furthermore, the animal can often remove the bait by careful action without causing the trap to act.

SUMMARY AND OBJECTS OF THE INVENTION

It is one object of the present invention to provide a trap which may be handled safely without triggering an catching a user's hand.

It is a further object of the present invention to provide a trap which may be loaded with one hand.

It is a further object of the present invention to provide a trap which allows utilization of any type of bait, even a liquid bait.

It is a further object of the present invention to provide a trap which does not allow the bait to be removed without triggering the trap.

According to the invention such a trap is characterized primarily in that the releasing mechanism is journalled around a second axis in the stand, forming a first arm portion designed like a cap above a vessel for bait, and a second arm portion acting upon the first arm of the clamp when the cap is lifted by the animal.

The present invention comprises a stand and a pivoting clamp, journalled around a first axis. The clamp may be strained against the action of a spring, and may be released by a releasing mechanism from a loaded position when an animal acts upon the releasing mechanism. When the releasing mechanism is activated, the clamp substantially immediately swings, acted upon by the spring, to a second position, where it hits and kills the animal.

The clamp, extending from the first axis, is provided with a first and a second arm. A first fastening point of the spring is provided at one end of the first arm. The second fastening point of the spring runs through or in the vicinity of the first axis, such that the spring exerts substantially no torque in the direction towards the second position of the clamp when the clamp is in its first position.

Within the scope of the invention, several embodiments are conceivable. In one suitable embodiment, the second arm portion of the releasing mechanism is provided with a lock which locks the first arm of the clamp when the arm is in its first position. The lock releases the first arm of the clamp when the cap is lifted by the animal.

In one suitable embodiment of the trap according to the present invention, there is provided a stop device for preventing the clamp from being turned to let the first arm of the clamp take a position in which the second arm portion of the releasing mechanism cannot act upon the first arm of the clamp.

In one further suitable embodiment, there is provided a guide for guiding small animals to the bait and preventing larger animals from acting upon the releasing mechanism.

It is advantageous to design the stand with a portion like a platform, extending backwards from the vessel. The object is that the animal will stand with the front legs on the platform when it is in a position to be hit by the clamp.

Advantageously, the cap and the container are designed in such a way that the bait may be seen and smelled by the animal.

BRIEF DESCRIPTIONS OF THE DRAWINGS

The invention is described in the following with one example of embodiment, which is not limiting, reference being made to the enclosed, schematic figures, in which:

FIG. 4A is a side view of the same trap, with an alternative guide.

FIG. 4B is a view of a parting wall for the guide in FIG. 4A.

DETAILED DESCRIPTION OF THE INVENTION

Figure 1:
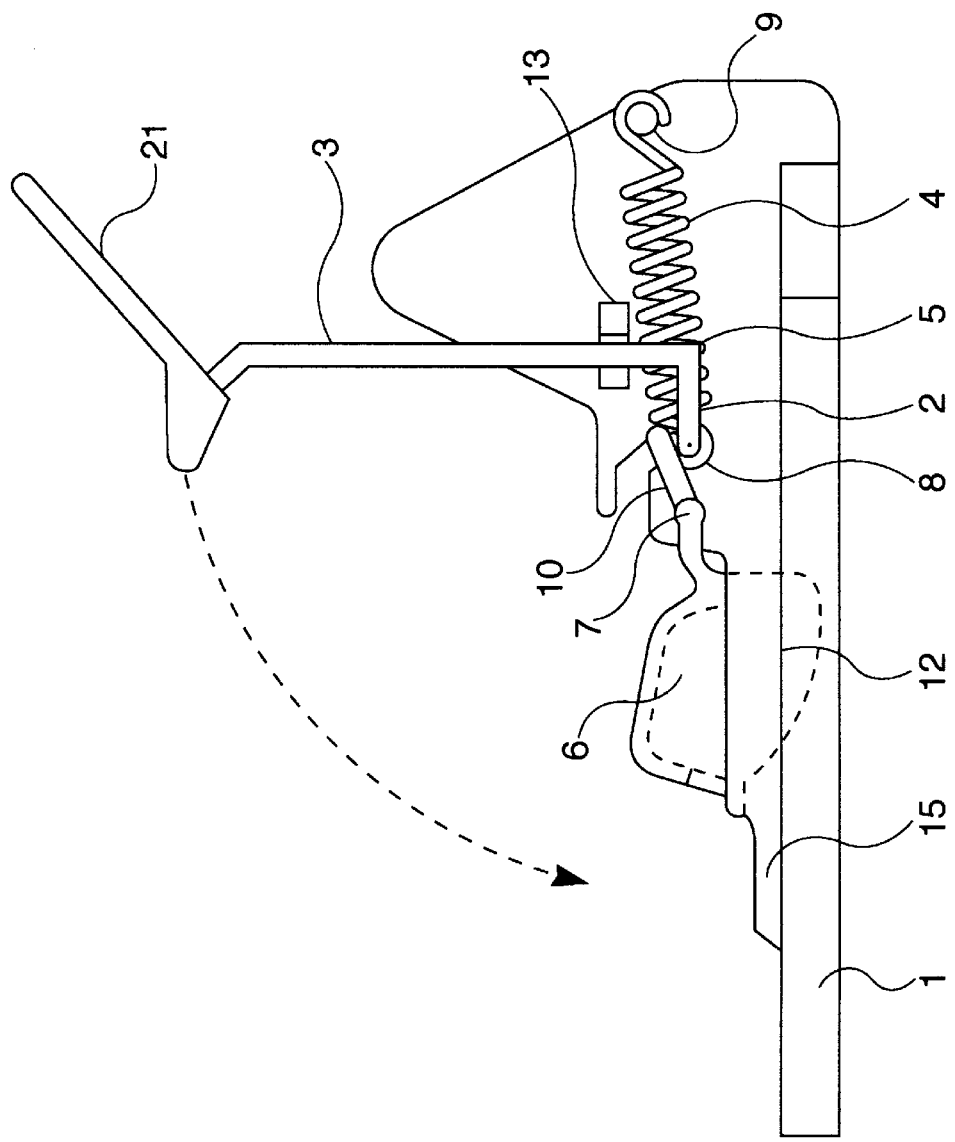
FIG. 1 is a side view of one embodiment of a trap according to the present invention, partly in section.
Figure 5:
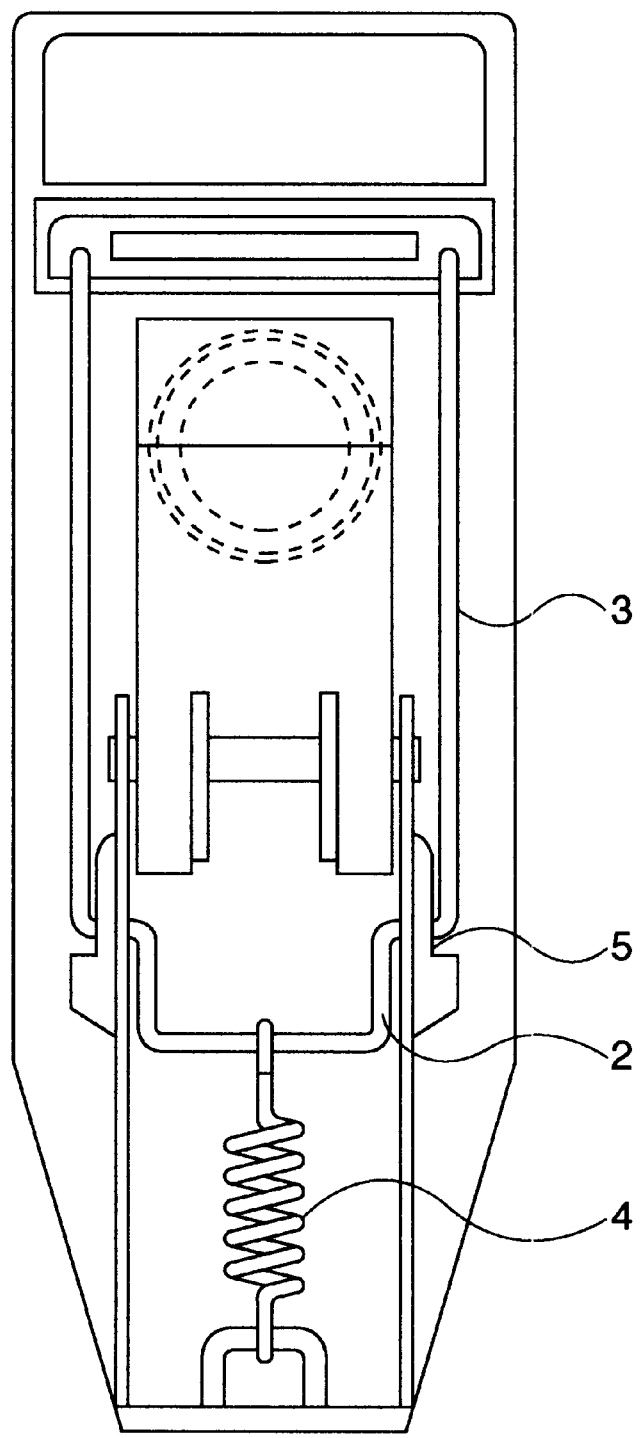
FIG. 5 is a plan view of a trap according to the present invention, partly in section.

Referring now to FIG. 1, a planar stand is denoted by 1. A clamp is journalled around a transverse, horizontal first axis 5. The clamp comprises a first arm 2 and a second arm 3, both extending from said first axis 5, forming, in the trap shown, approximately a mutual right angle. In the Figures, the clamp is illustrated in a first, loaded position, against the tensile force of a coil spring 4. Coil spring 4 is fastened at one end to outer part 8 of first arm 2 and at the other end rear part 9 of stand 1. FIG. 5 is a top view of the apparatus of FIG. 1, illustrating the connection of coil spring 4.

Second arm 3 rests against stop device 13, and the force line of coil spring 4 runs a little, but not very much, above first axis 5. Thereby, coil spring 4 does not exert any significant turning moment on the clamp in a direction towards the animal when the clamp is in the first position.

Thus, unlike prior art spring mousetraps, the clamp in the present invention provides very little force when in the set position as illustrated in FIG. 1. As the clamp rotates toward a second position (as indicated by the arrow in FIG. 1), the force line of coil spring 4 moves further away from fist axis 5, generating an increased force on second arm 3 until the clamp can hit the animal, killing it.

Container 12 is provided, along with covering cap 6, journalled around a second horizontal axis 7. Cap 6 is connected to second arm portion 10, which extends from second axis 3 in such a way that when cap 6 is locked, second arm portion 10 is above and in contact with first arm 2 of the clamp. Cap 6 is designed to be easily moved by a small animal. Recesses in cap 6 and container 12 are directed toward the animal entrance as may be seen in FIG. 7. The recesses in cap 6 and container 12 may allow the animal to view and smell bait placed within container 12.

Figure 3:
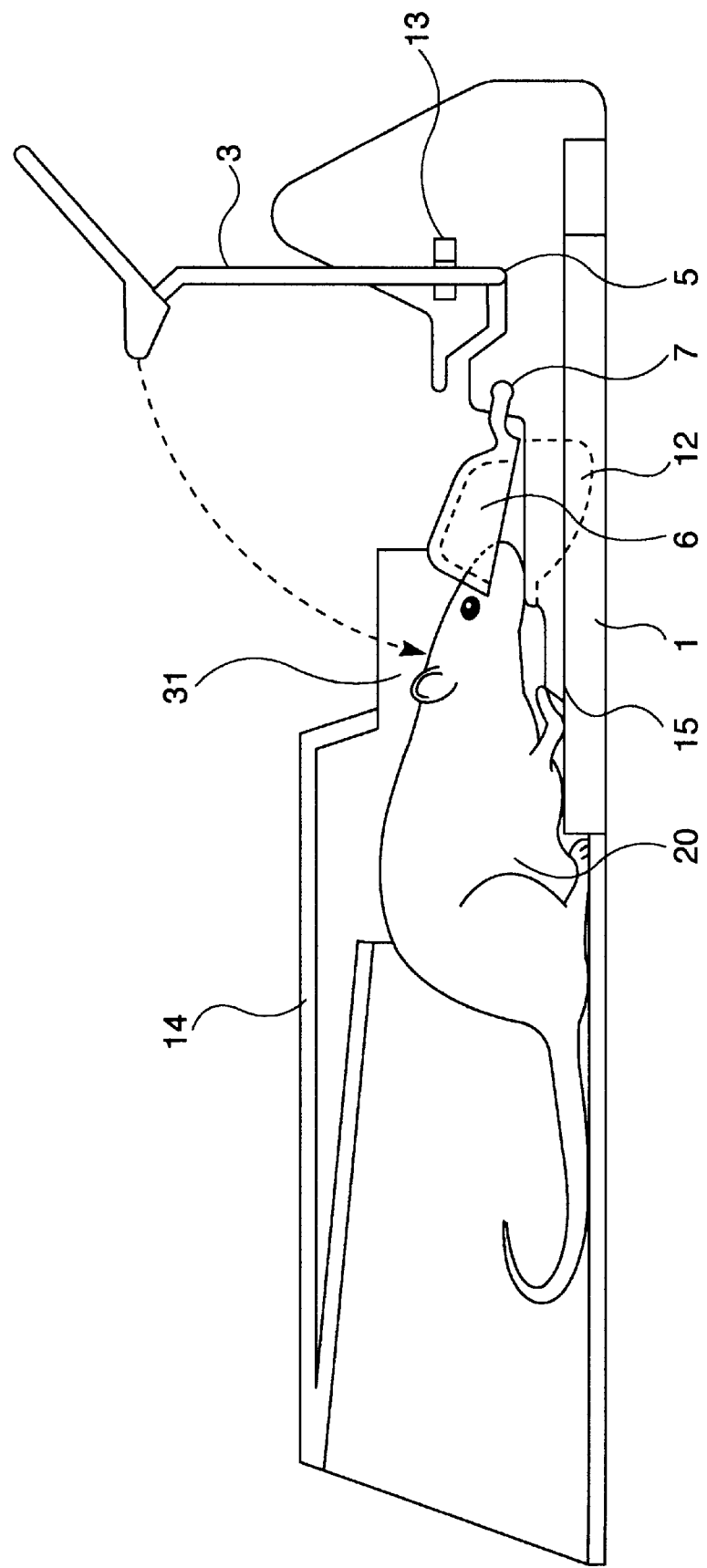
FIG. 3 is a side view of a trap according to the present invention, with a guide in section.

If an animal lifts cap 6, (as illustrated in FIG. 3) second arm portion 10 will press down first arm 2 past the neutral position of coil spring 4, whereupon coil spring 4 exerts a quickly increasing tensile force, so that the clamp more or less immediately hits against its second position, killing the animal. Thus cap 6 forms, together with second arm portion 10, a releasing mechanism.

Figure 8:
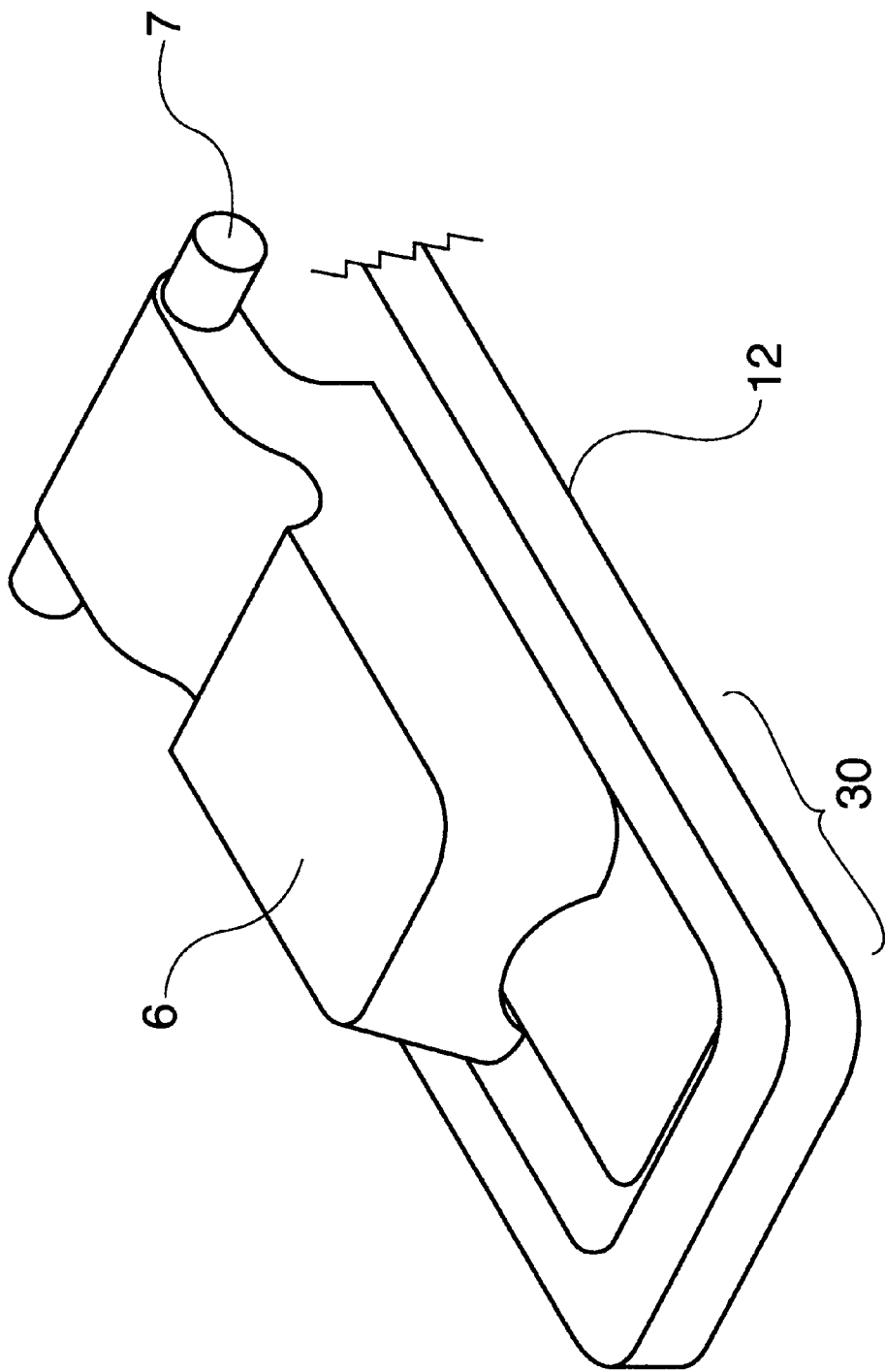
FIG. 8 is a perspective view of an embodiment of cap with container.

FIG. 8 illustrates how container 12 may be extended in a direction towards the animal with a portion 30, which can also be formed like a narrow slot. The animal is led by the bait in this portion or slot in the direction of cap 6 and lifts same to get in touch with the bait under the cap.

Referring again to FIG. 1, stop device 13 prevents the clamp from inadvertently turning such that second arm portion 10 of the releasing mechanism cannot act upon first arm 2 of the clamp in the intended way. It can be seen that stand 1 is designed with a platform 15 extending rearward from container 12. In operation, an animal will stand with its both front legs on platform 15 in the desired killing position.

Figure 6:
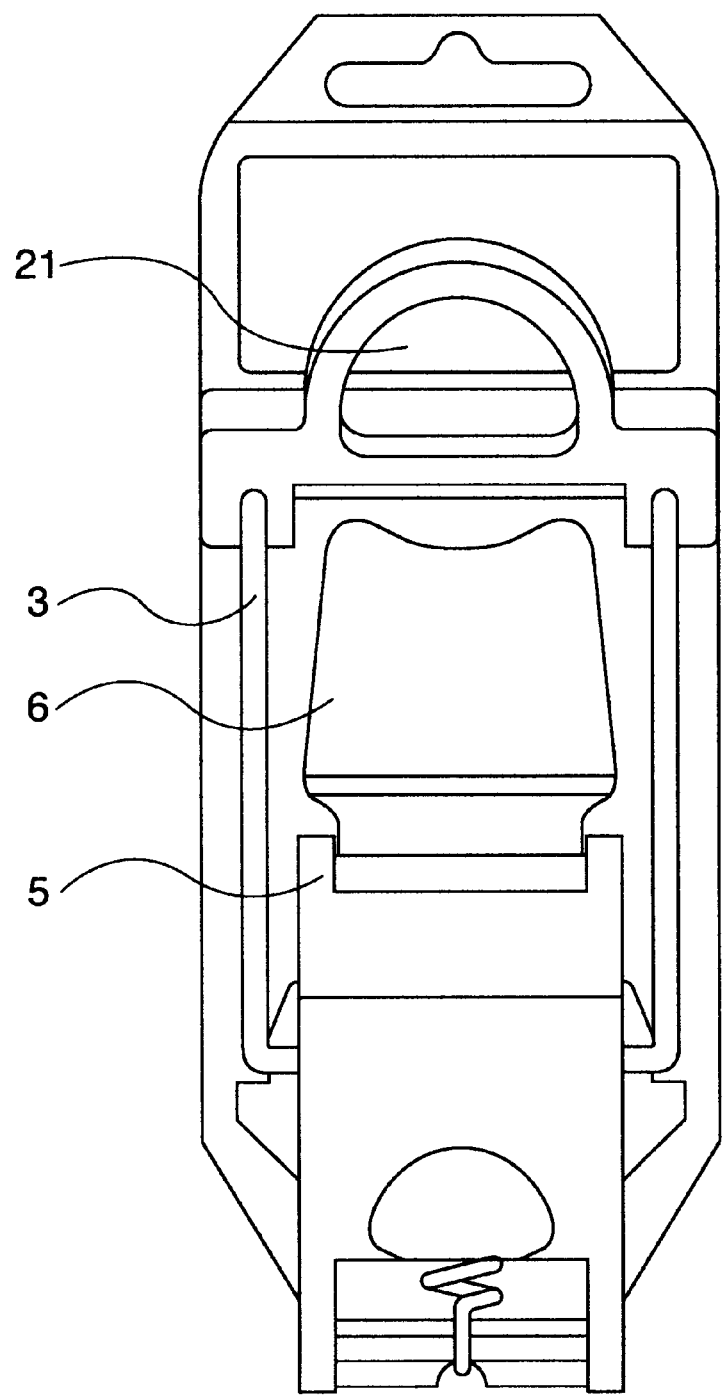
FIG. 6 is a plan view of a trap according to the present invention.
Figure 7:
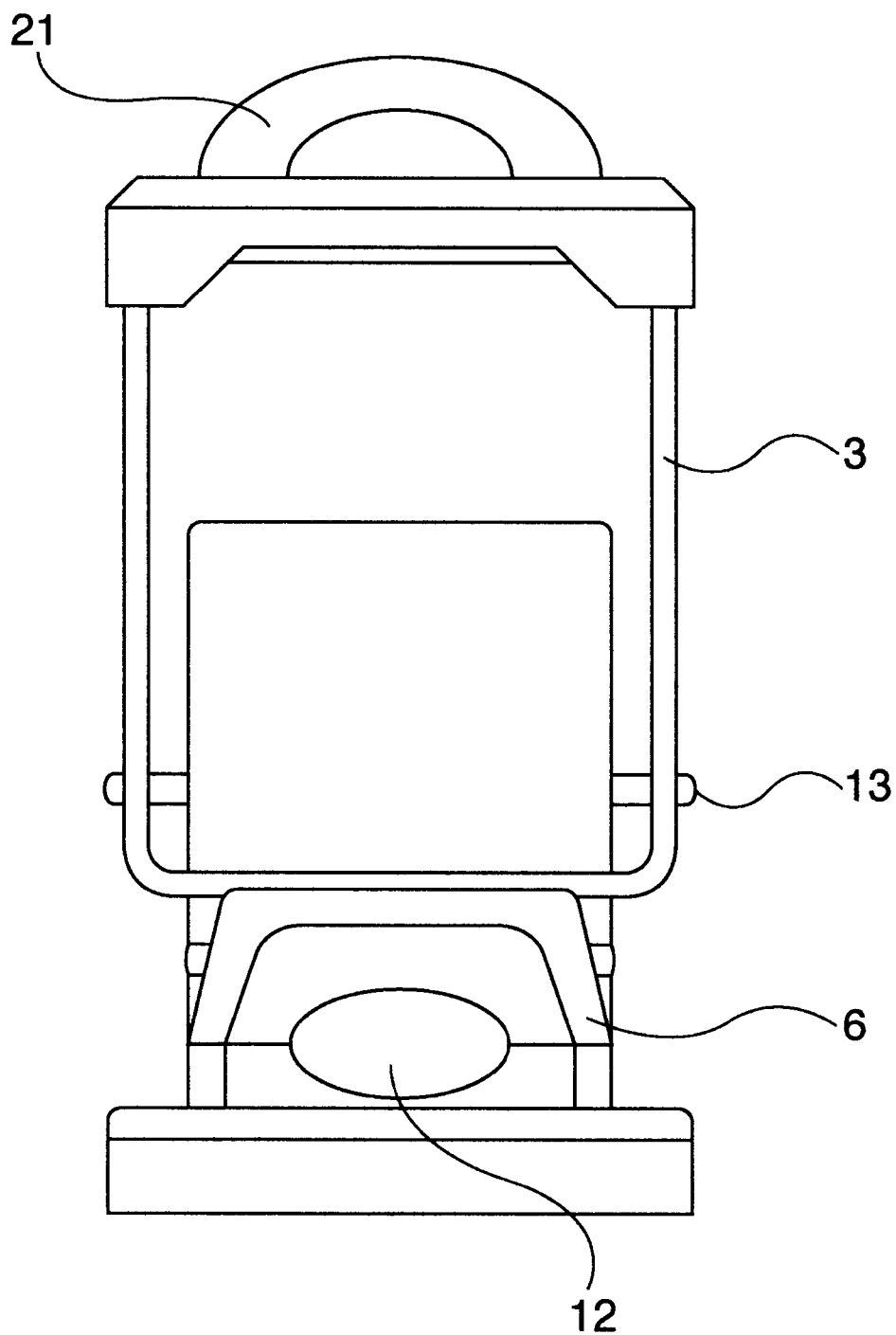
FIG. 7 is a view in the direction towards the container of the trap.

The outer part of second arm 3 may suitably be provided with a loop handle 21, as illustrated in FIGS. 6 and 7. Loop handle 21 facilitates handling and setting of the trap.

Figure 2:
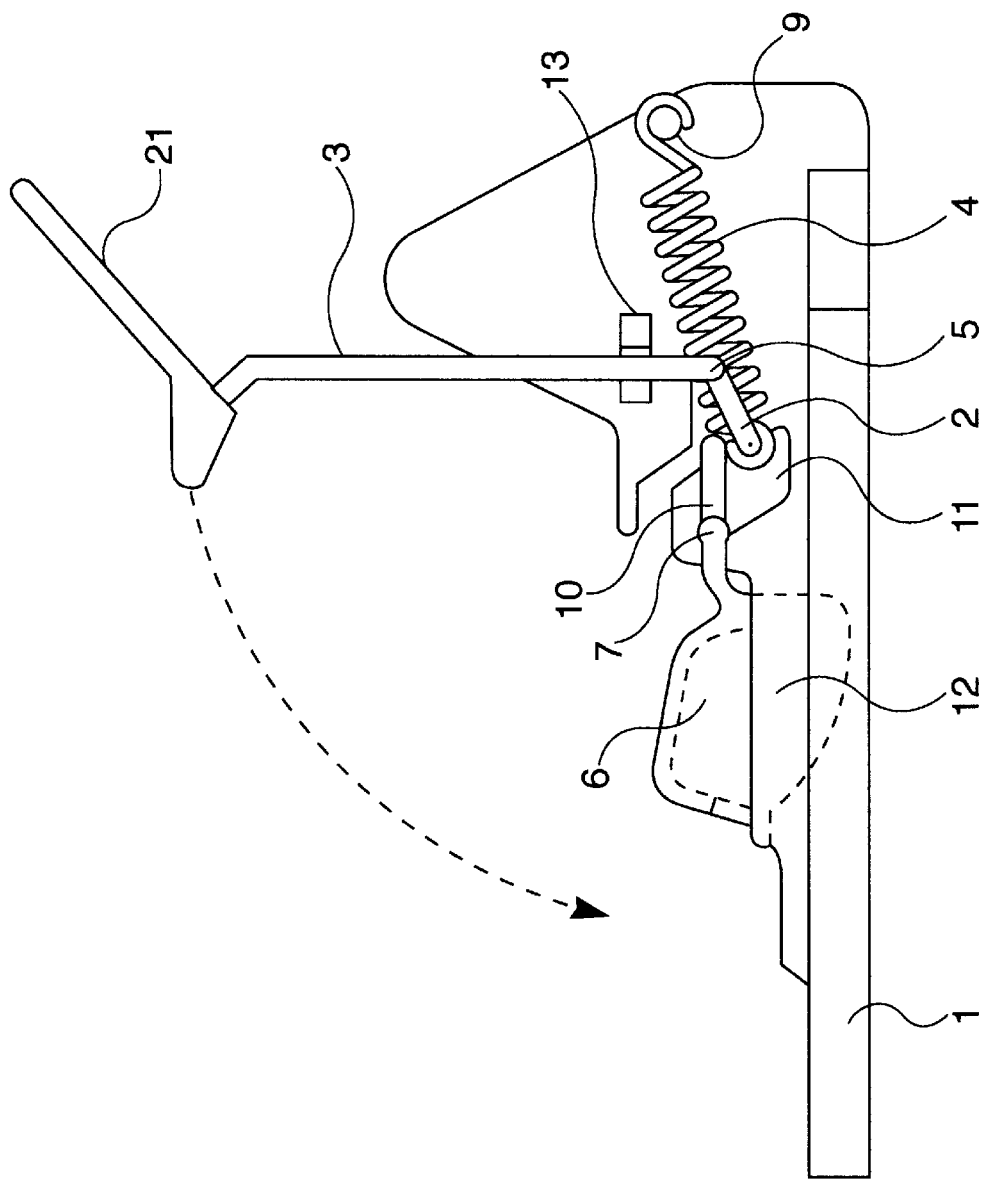
FIG. 2 is a side view of an alternative embodiment of a trap according to the present invention, partly in section.

FIG. 2 illustrates an alternative embodiment of a trap according to the present invention. Here, second arm portion 10 of releasing mechanism is provided with a securing member 11, which locks first arm 2 of the clamp when the claim is in its first loaded position. The object is to prevent the trap from releasing inadvertently, (e.g., by a thrust from the rear on the second arm 3 of the clamp). Securing member 11 releases first arm 2 of the clamp when cap 3 is lifted by an animal.

In the trap illustrated in FIG. 2, the force line of coil spring 4 runs below first axis 5 in the first, loaded position. Thus, coil spring 4 in the loaded position exerts a certain but minor turning moment on the clamp in the direction towards its second (sprung) position. This turning moment thus is counteracted upon by securing member 11.

In FIG. 3, there is shown in section guide 14 in the form of a funnel. The object of the latter is to guide animal 20 of a desired size to container 12 and cap 6. In order to prevent animals from accessing the bait from the side, guide 14 is provided with two sidewalls 31, one of which is indicated in FIG. 3. Guide 14 and sidewalls 31 are designed in such a way that the clamp with its second arm 3 has a clear path down to the head of animal 20 when the animal lifts the cap. It is important that guide 14 has a floor in connection with its walls so that animal 20 cannot enter guide 14 and tilt the trap.

An alternative design of a guide is illustrated in FIGS. 4A and 4B. Here the guide consists of a first funnel compartment 23, a transverse vertically displaceable cross wall 25 and a second funnel compartment 24 in direct connection to the trap. Cross wall 25 is provided with an opening 30 which may be adapted to animals of a desired maximum size. Cross wall 25, as illustrated in FIG. 4B may be removed from between compartments 23 and 24. Different sized cross walls 25 may be used to allow access by different sized animals.

Figure 9:
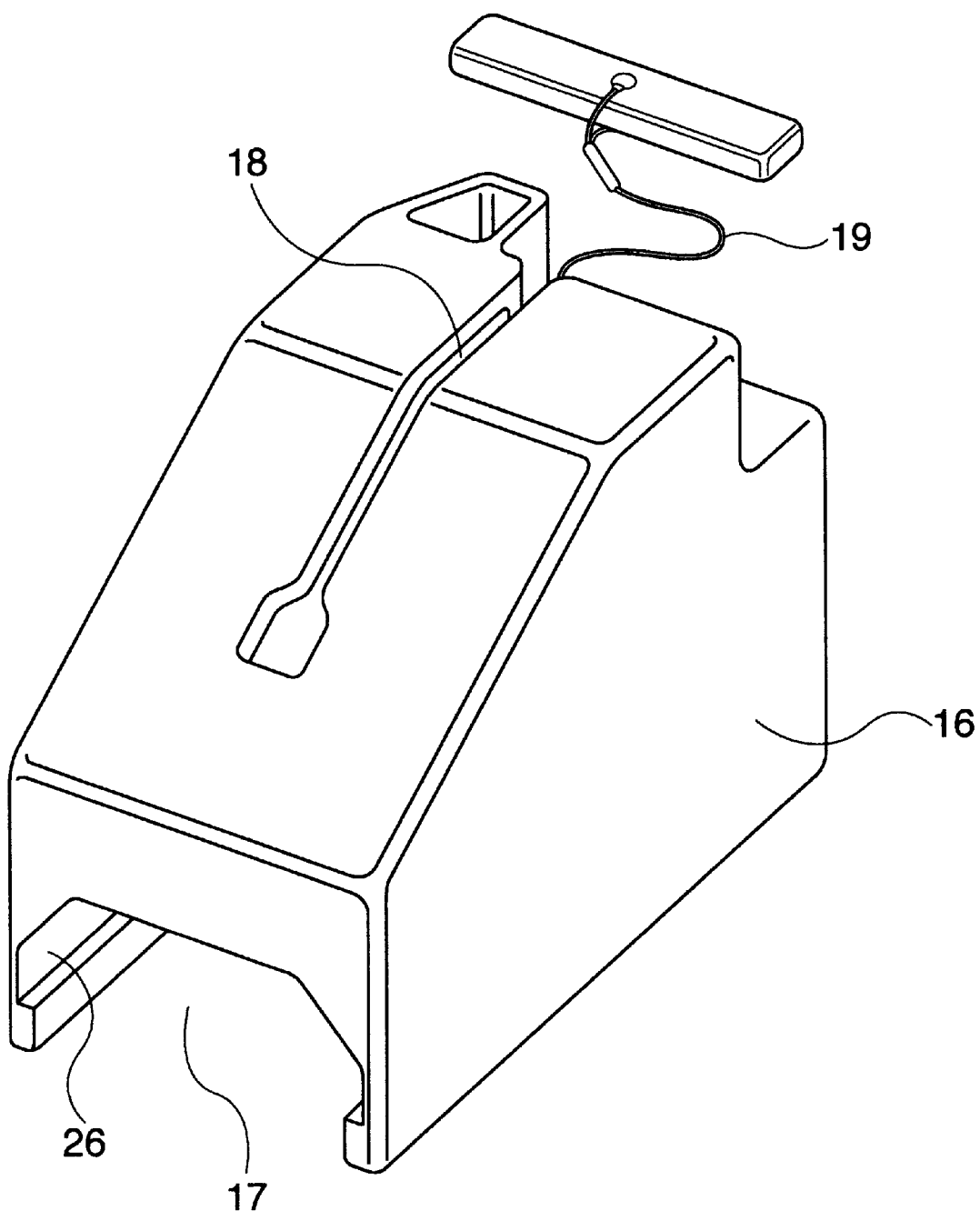
FIG. 9 is a perspective view of a shell for including in the trap.
Figure 10:
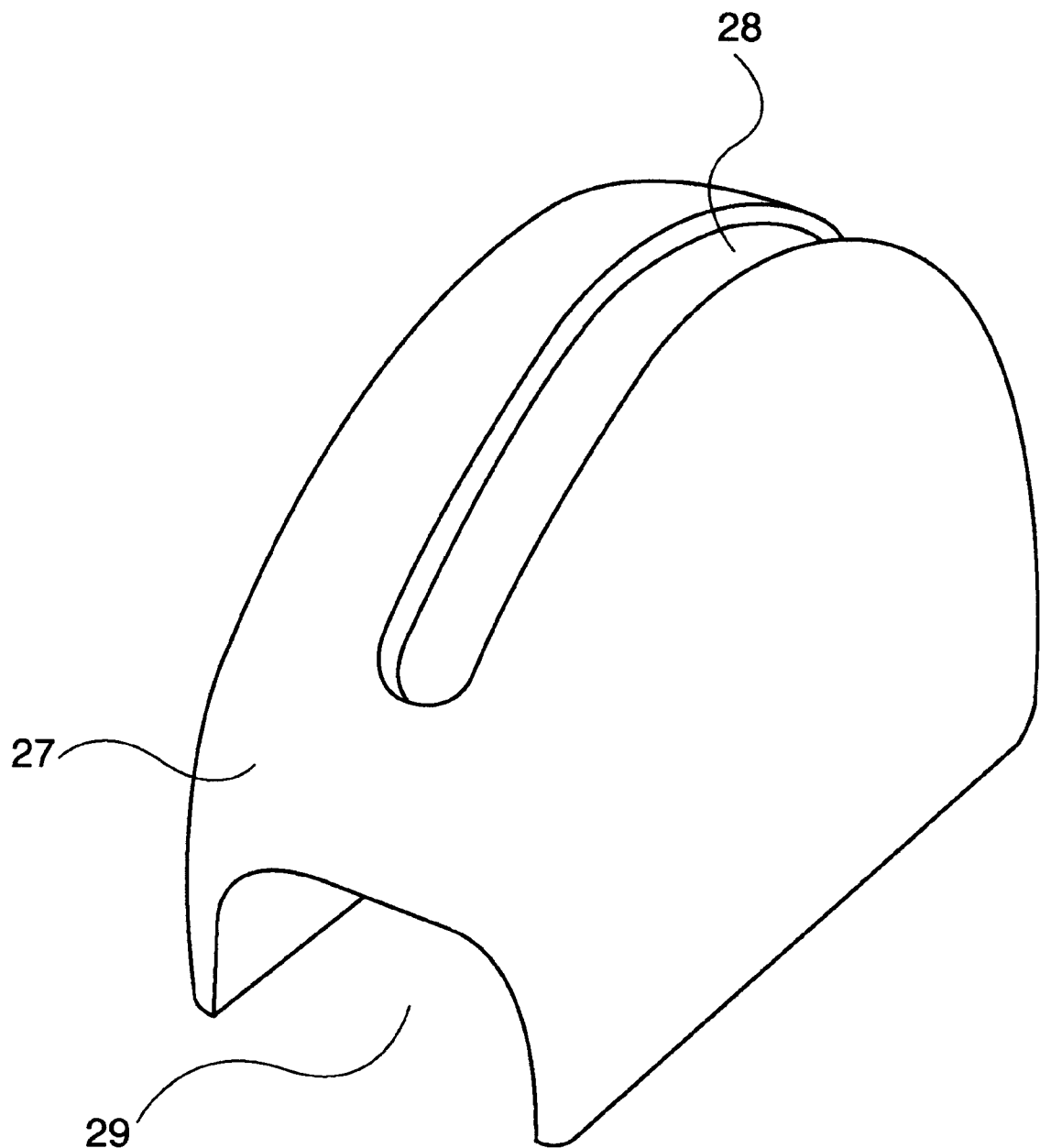
FIG. 10 is a perspective view of an alternative embodiment of a shell for the trap of the present invention.
Figure 11:
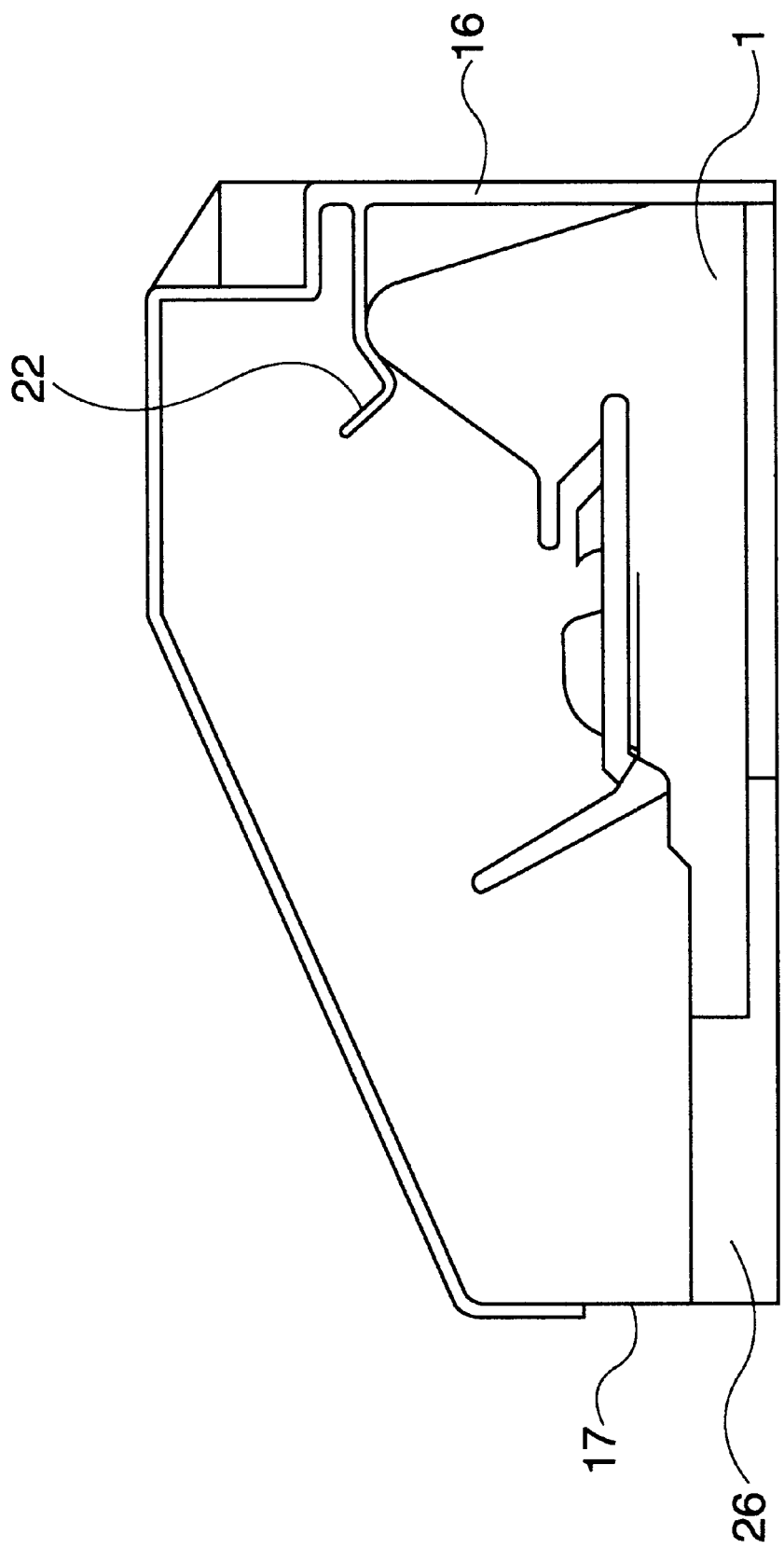
FIG. 11 is a side view of the trap of the present invention illustrating the shell installed.

FIGS. 9, 10 and 11 illustrate two embodiments of a shell into which the trap of the present invention may be inserted and loaded. Shell 16 in FIG. 9, is designed, at the front side, with a first opening 17, adapted to the desired maximum size of animals to be trapped. Shell 16 is provided with inner grooves 26 for receiving the trap. The trap is inserted to a rear position where it is snapped fixed with a snap-in 22 illustrated in FIG. 11. Shell 16 with snap-in 22 may be suitably manufactured from plastic. Shell 16 is, in this embodiment, provided at the upper side with a relatively small groove 18, wherein a string 19 or the like can be led to load the trap.

FIG. 10 illustrates a second embodiment of a shell 27 provided with an opening 29 of a size that permits entry for the maximum size of an animal to be trapped. Shell 27 is provided with a relatively broad groove 28 for allowing the trap to be loaded by hand.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein.

As may be appreciated by the above description, one distinction between the first embodiment of the present invention and typical prior art mousetraps is that in the prior art, the releasing mechanism actually holds back the force of a spiral spring. Thus, to set the trap, two hands are needed, one to set the clamp, and another to set the releasing mechanism. If a user is not careful, the trap will spring (especially when applying bait) and trap the user. In the first embodiment of the present invention, in contrast, the releasing mechanism does not hold back the force of the spring, but rather engages the clamp to push the clamp into a position where the spring can effect a torque on the clamp.

Thus, in the first and preferred embodiment of the present invention, the trap, when set, has little or no inherent torque or pressure being exerted on the releasing mechanism. On the contrary, it is the releasing mechanism which pressures the clamp to force the clamp into a position where the spring will act upon it.

In the second embodiment of the present invention, the release mechanism does hold back spring pressure from the spring. However, due to the lever action of the pivoting clamp, the spring pressure may not be equal to the total force of the spring, but rather only a portion thereof. Thus, the triggering mechanism is not placed in as much stress and thus has less likelihood of being accidentally triggered while still providing certain triggering when an animal enters.

Certainty in triggering is achieved, in part, due to the nature of the trigger mechanism. Prior art mousetraps relied upon the mouse or animal to move a trigger plate laterally. The trigger plate, held in tension by the clamp arm, may not move, even if the bait were eaten. In the present invention, the bait cap is moved by the animal's head when it pokes it head into the enclosure to snare the bait. Such a motion (poking a head into a hole) is natural for an animal. Moreover, in the apparatus of the present invention, the bait cannot be taken without triggering the trap.

It is therefore intended that the protection granted hereon be limited only by the definition contained in the appended claims and equivalents thereof.

I claim:

1. A trap for trapping small animals, said trap comprising:
a stand;
a pivoting clamp, journalled in the stand around a first axis, for rotatably moving between a first set position and a second released position, said pivoting clamp having a first arm having an axis substantially perpendicular to the first axis, and a second arm having an axis turned from the axis of the first arm;
a spring having one end coupled to the stand and another end coupled to the second arm of the pivoting clamp such that a force exerted by the spring between the ends of the spring passes through a line running through or in the vicinity of said first axis so that the spring applies substantially no torque to the pivoting clamp when the pivoting clamp is in the first set position;
a releasing means, coupled to the stand, for selectively engaging the second arm of the pivoting clamp, such that when an animal acts upon the releasing means, the releasing means moves the pivoting clamp to a position where force exerted by the spring between the ends of the spring passes through a line running away from said first axis so that the spring applies a torque to the pivoting clamp so that the pivoting clamp substantially immediately swings to the second released second position where it hits the animal,
wherein said releasing means further comprises:
a bait holding means for holding bait; and
a pivoting bait cover, substantially covering the bait holding means and having an arm portion for selectively engaging the second arm of the pivoting clamp, such that when the pivoting bait cover is moved, the arm portion moves the pivoting clamp to a position where force exerted by the spring between the ends of the spring passes through a line running away from said first axis so that the spring applies a torque to the pivoting clamp so that the pivoting clamp substantially immediately swings to the second released second position where it hits the animal.

2. A trap according to claim 1, further comprising a stop device for preventing the pivoting clamp from rotating when the pivoting clamp is in the first set position.

3. A trap according to claim 2, further comprising a guide means, coupled to the stand, for guiding small animals to the bait but preventing larger animals from acting upon the releasing means.

4. A trap according to claim 3, wherein the stand further includes a platform portion, extending backwards from the bait holding means, for supporting the animal and preventing the animal from tipping the trap over.

5. A trap according to claim 4, wherein the bait holding means and the pivoting bait cover selectively engage so as to form an opening to allow the animal to see and smell the bait, such that when the animal places its head in the opening, the pivoting bait cover pivots, triggering the trap.

6. A trap according to claim 5, further comprising:
an outer shell into which the trap may be inserted to a protected position, which shell is provided with a first opening, with such a size, and located in such a way that it admits animals of a desired, maximum size access to the releasing device, and that the shell is provided with an elongated second opening arranged in such a way that a string or the like may be led in through the second opening and releasably stretch the pivoting clamp to the first set position.

7. A mousetrap, comprising:
a base;
a movable arm pivoting along a first axis parallel to the base, the movable arm having a first set position when the mousetrap is set, and a second released position when the mousetrap is triggered, the movable arm having a first portion perpendicular to the first axis for engaging and trapping an animal, and a second portion perpendicular to the first axis;
a spring connected to the base and the movable arm such that when the mousetrap is set, the spring is in tension with a force passing through the first axis so as to exert substantially no torque to the movable arm; and
a trigger, pivotably coupled to the base and selectively engageable with the movable arm, for moving the movable arm from a position where the spring is in tension with a force passing through the first axis such that the spring exerts a torque on the movable arm moving the movable arm to the second released position,
wherein said trigger comprises:
a bait holder for holding a bait; and
a bait holder cover, pivotably coupled to the base and substantially covering the bait, the bait cover moving the movable arm when moved,
wherein the bait holder and the bait holder cover selectively engage so as to form an opening to allow the animal to see and smell the bait, such that when the animal places its head in the opening, the bait holder cover pivots, triggering the trap.

8. The mousetrap of claim 7, further comprising:
a cover, coupled to said base, for limiting access to the bait holder by an animal to one direction, said cover having an opening sized to prevent access by animals larger than a predetermined size.

9. A mousetrap, comprising:
a base;
a movable arm pivoting along a first axis parallel to the base, the movable arm having a first set position when the mousetrap is set, and a second released position when the mousetrap is triggered, the movable arm having a first portion perpendicular to the first axis for engaging and trapping an animal, and a second portion perpendicular to the first axis;
a spring connected to the base and the movable arm such that when the mousetrap is set, the spring is in tension with a force passing adjacent the first axis so as to exert a torque to the movable arm; and
a trigger, pivotably coupled to the base and selectively engageable with the movable arm, for holding the movable arm from movement when the trigger is set and for releasing the movable arm from the first set position such that the spring exerts a torque on the movable arm moving the movable arm to the second released position
wherein said trigger comprises:
a bait holder for holding a bait; and
a bait holder cover, pivotably coupled to the base and substantially covering the bait, the bait cover moving the movable arm when moved,
wherein the bait holder and the bait holder cover selectively engage so as to form an opening to allow the animal to see and smell the bait, such that when the animal places its head in the opening, the bait holder cover pivots, triggering the trap.

10. The mousetrap of claim 9, further comprising:
a cover, coupled to said base, for limiting access to the bait holder by an animal to one direction, said cover having an opening sized to prevent access by animals larger than a predetermined size.

* * * * *